CONSTANT VOLTAGE SOURCE

INVENTOR
LANNY L. HARKLAU
BY Thomas J. Nikolai
ATTORNEY

United States Patent Office 3,431,491

Patented Mar. 4, 1969

3,431,491

MEMORY APPARATUS AND METHOD

Lanny L. Harklau, Minneapolis, Minn., assignor to Sperry Rand Corporation, New York, N.Y., a corporation of Delaware Filed Nov. 20, 1964, Ser. No. 412,706
U.S. Cl. 324—68 8 Claims
Int. Cl. G01r 33/02

ABSTRACT OF THE DISCLOSURE

A detector for the determination of the time separation between successive pulses of an electrical signal. The time difference between successive pulses establishes a corresponding partially-switched stable-state in an inductively associated magnetizable memory element. Upon readout of the memory element the partially-switched stable-state provides a corresponding output signal that is a function of the time separation between the successive pulses.

Ordinary magnetizable cores and circuits utilized in destructive readout devices are now so well known that they need no special description herein. However, for purposes of the present invention, it should be understood that such magnetizable cores are capable of being magnetized to saturation in either of two directions. Furthermore, these cores are formed of magnetizable material selected to have a rectangular hysteresis characteristic which ensures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum staturation flux density. These magnetic core elements are usually connected in circuits providing one or more input coils for purposes of switching the core from one magnetic state corresponding to a particular direction of saturation, i.e., positive saturation denoting a binary "1," to the other magnetic state corresponding to the opposite direction of saturation, i.e., negative saturation denoting a binary "0." One or more output coils are usually provided to sense when the core switches from one state of saturation to the other. Switching can be achieved by passing a current pulse of sufficient magnitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One method of achieving a decreased magnetic core switching time is to employ time-limited switching techniques as compared to amplitude-limited switching techniques. In employing the amplitude-limited switching technique, the hystersis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is considerably less than the flux density of the second stable state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, supplement, vol. 32, No. 3, pp. 38S–39S, March 1961, provides excellent background material for the switching technique utilized in the present invention.

The magnetic conditions and their definitions as discussed above may now be itemized as follows:

PARTIAL SWITCHING

Amplitude-limited—condition wherein with a constant drive field amplitude, increase of the drive field duration will cause no appreciable increase in core flux density.

Time-limited—condition wherein with a constant drive field amplitude, increase of the drive field duration will cause appreciable increase in core flux density.

COMPLETE SWITCHING

Saturated—condition wherein increase of drive field amplitude and duration will cause no appreciable increase in core flux density.

Stable-state—condition of the magnetic state of the core when the core is not subjected to a variable magnetic field or to a variable current flowing therethrough.

Steady-state—condition of the magnetic state of the core wherein with a saturating drive field or an amplitude-limited drive field applied, increase of the drive field duration will cause no appreciable increase in core flux density.

The preferred embodiment of the present invention is concerned with the establishment of a predeterminably variable time-limited magnetic flux level in a magnetizable memory element which flux level is representative of the time separation between two consecutive spikes of a transient electrical signal. In the preferred embodiment a transient signal having a plurality of relatively short duration peaks, or spikes, is coupled to a shift register, or serial counter, that emits a significant output signal from the next higher stage upon receipt of each consecutive spike; the maximum amplitude of the base portion of the transient signal is limited to a level well below the gating threshold of the shift register such that the base portion of the transient signal alone is incapable of effecting the shift level of the shift register. With the magnetizable memory element intially set into a first-polarity substantially saturated stable-state of residual magnetization the first spike gates the shift register whose first stage triggers a first time-limited first-polarity pulse generator, which first pulse is coupled to the magnetizable memory element moving the element's magnetization further into the first-polarity saturated state. The next spike gates the shift register whose second stage triggers a second and opposite-polarity time-limited pulse generator which second pulse is coupled to the magnetizable memory element. The duration of the first pulse is sufficient to encompass any expected time separation between the first and the second spikes such that the longest expected time separation is less than the duration of the first pulse. As the first and second pulses are of opposite polarities as regards the magnetizable memory element and as the first pulse is of at least the amplitude of the second pulse the magnetic state of the magnetizable memory element is not moved beyond the switching threshold $NI_0$ by the application of the second pulse concurrent with the first pulse. However, at the termination of the first pulse, the continuing second pulse is effective to move the magnetic state of the magnetizable memory device toward the opposite magnetic state; the degree that the magnetic state is altered, or moved, beyond the switching threshold $NI_0$ is a linear function of the duration of the second pulse after termination of the first pulse. Accordingly, there is provided by the present invention a means of recording in a magnetizable memory element a flux level (the degree of the alteration of the magnetizable memory element's magnetic state by the second pulse) that is a function of the duration between two spikes of a transient electrical signal.

It is an object of the present invention to provide a means of measuring the time interval between two significant signals.

It is a further object of the present invention to provide a method of operating a magnetizable memory element for recording the time duration between two significant signals as a corresponding flux level.

These and other more detailed and specific objects will be disclosed in the course of the following specification, reference being had to the accompanying drawings, in which.

To better understand a novel aspect of the present invention, a discussion of a constant current source driving signal as opposed to the use of a constant voltage source driving signal is presented.

Figure 1:
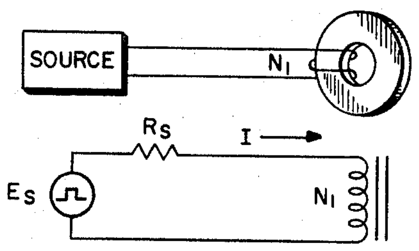
FIG. 1 is an illustration of the general circuit and its equivalent schematic of a source driving a toroidal ferrite core.

A constant voltage source is a source whose output voltage level is independent of the applied load while a constant current source is a source whose output level is independent of the applied load. FIG. 1 illustrates the general circuit of a source driving a toroidal ferrite core with its equivalent circuit:

$E_s$=source voltage
$R_s$=source internal resistance
$N_1$=number of turns in the coil about the core
I=current flowing through the coil about the core.

This circuit may be defined mathematically by Equation 1

$$E_s=IR_s-N\frac{d\phi}{dt} \tag{1}$$

with it being assumed that the core is always initially in its negative saturated state and that the drive signal from the source drives the magnetic state of the core toward its positive saturated state. If $R_s$ is made sufficiently small, Equation 1 reduces to Equation 2.

$$E_s\cong-N\frac{d\phi}{dt} \tag{2}$$

Therefore by making $R_s$ sufficiently small the conditions of a constant voltage source are fulfilled. Since $E_s$ and N are constants, $d\phi/dt$ is also a constant, and consequently the flux reversal is a linear function of time.

$$\int_{-\phi_s}^{\pm\phi_1} d\phi=\frac{E_s}{N_1}\int_0^t dt$$

$$\phi_s-\phi_1=\frac{E_st}{N_1} \tag{3}$$

For a somplete flux reversal the integral, taken from $-\phi_s$ to $+\phi_s$, is (with $T_s$= time required for a complete flux reversal from $-\phi_s$ to $+\phi_s$)

$$\int_{-\phi_s}^{+\phi_s} d\phi=\frac{E_s}{N_1}\int_0^{T_s} dt$$

$$2\phi_s=\frac{E_sT_s}{N_1} \tag{4}$$

The voltage E induced in any coil about the core is (with $N_2$=the number of turns of a second coil on the core)

$$E=\frac{E_sN_2}{N_1}=\frac{2\phi_s}{T_s}N_2$$

Figure 3:
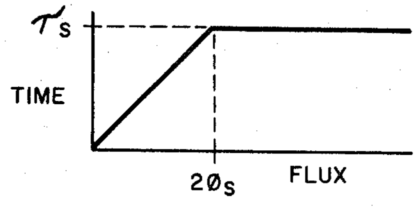
FIG. 3 is an illustration of the plot of flux versus time of the core of FIG. 2.
Figure 2:
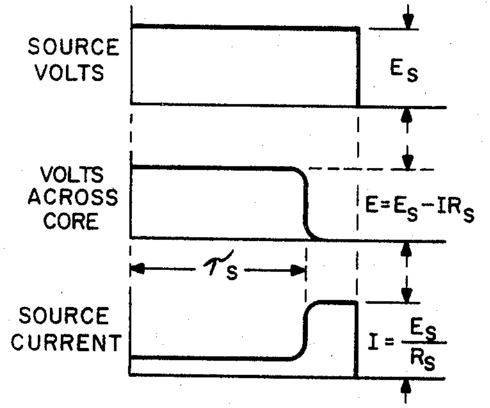
FIG. 2 is an illustration of the resulting voltages and currents of the circuit of FIG. 1 when driven by a constant voltage source.

The resulting voltages and currents under constant voltage source conditions are illustrated in FIG. 2, Equations 3 and 4 show that a plot of flux $\phi$ versus time would be as illustrated in FIG. 3. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_s$ as illustrated in FIG. 3 is due to the characteristics of the constant voltage source rather than those of the core.

If $R_s$ is made sufficiently large, Equation 1 reduces to Equation 5.

$$E_s \cong IR_s \quad (5)$$

Figure 4:
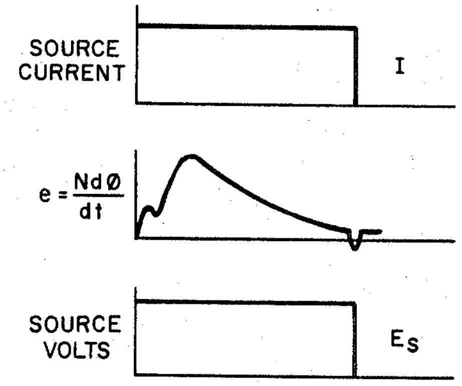
FIG. 4 is an illustration of the resulting voltages and currents of the circuit of FIG. 1 when driven by a constant current source.

Therefore, by making $R_s$ sufficiently large, the conditions of a constant current source are fulfilled. From inspection of Equation 5 it is apparent that the constant current source has an insignificant effect on the flux reversal or the rate of flux reversal in the core. Under these conditions the flux reversal can be thought of the intrinsic magnetic behavior of the core with the resulting voltages and currents under constant current source conditions as illustrated in FIG. 4. It is under these constant current source conditions that this present invention is concerned.

A phenomenological understanding of a time-limited flux state in a toroidal core, or the flux path about an aperture in a plate of magnetizable material such as transfluxor, can be obtained by considering the flux distribution therethrough. The switching time $\tau_s$, or the time required for complete flux reversal from a first flux saturated state to a second and opposite flux state is given as follows:

$$\tau_s = \frac{Sw}{H - H_0} = \frac{Sw'}{NI - NI_0}$$

where $r$=radius of toroidal core
$\tau_s$=switching time
I=current in amperes
Sw=material constant
N=number of turns
H=applied in oe (oersteds)$=NI/5r$
$H_0$=switching threshold in oe$=NI_0/5r$
$Sw'=Sw5r$ Since the applied field H is inversely proportional to the radius of the core, flux reversal takes place faster in an inside ring of the core than in an outside ring of the core. That portion of the core which is in a partial switched state exhibits magnetic properties that are similar to a demagnetized state except for some asymmetry. The amount of asymmetry and the shape of the curve for a time-limited state are functions of both the drive field amplitude and duration.

Figure 5:
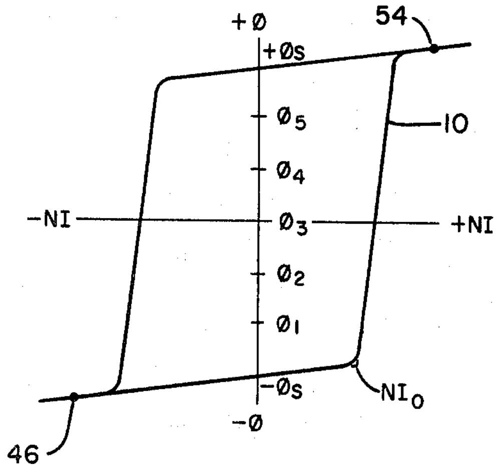
FIG. 5 is an illustration of the residual magnetization curve for the magnetizable memory element utilized by the present invention.

With particular reference to FIG. 5 there is illustrated a residual magnetization curve 10 of the magnetic devices utilized by the present invention. Curve 10 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first polarity saturated remanent magnetic state, such as $-\phi_s$, into a second and opposite polarity saturated remanent magnetic state, such as $+\phi_s$.

Figure 9:
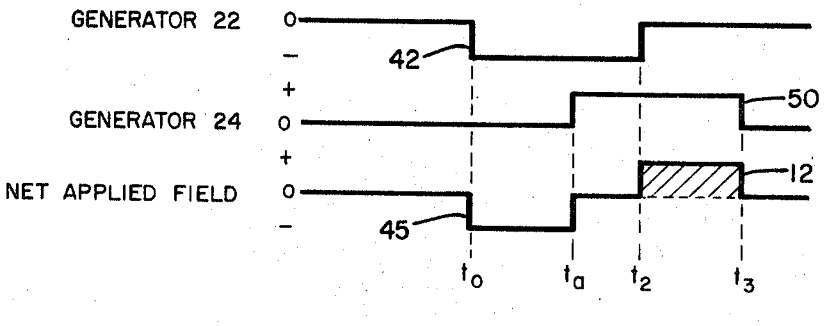
FIG. 9 is an illustration of the signals and resulting magnetomotive forces applied to the embodiment of FIG. 3.

In the preferred application of applicant's illustrated embodiment there is utilized a pulse, such as pulse 12 of FIG. 9, which pulse is of a sufficient amplitude but of an insufficient duration to switch the magnetic state of the coupled core from $-\phi_s$ to $+\phi_s$—see FIG. 5. This pulse 12 is obtained from a constant voltage source and is limited in duration, e.g., time-limited, so as to set the magnetic state of the core in an intermediate remanent flux level between $-\phi_s$ and $+\phi_s$; a zero duration pulse 12 leaves the magnetic state of the core at $-\phi_s$. Any increase in the amplitude of pulse 12 causes the magnetic state of the coupled core to be set into a different greater flux level such as $\phi_1$—$\phi_5$ although, in the preferred embodiment pulse 12 is assumed to originate in a constant voltage source such is not to be construed as a limitation thereto. The use of a constant voltage source pulse provides the linearity of $\phi$ vs. time (see FIG. 3 and FIG. 6) which simplifies the correlation of the readout signal amplitude-time separation relationship. If a faster sampling speed is required than provided by a constant voltage source pulse a constant current source pulse may be utilized. However, such constant current source pulse provides a nonlinear $\phi$ vs. time relationship and consequently requires a more empirical determination of the readout signal amplitude-time separation relationship.

Figure 6:
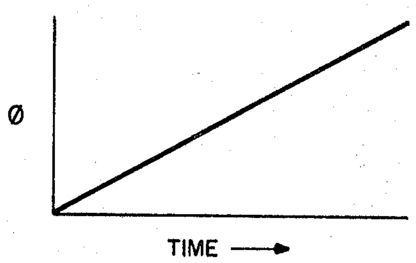
FIG. 6 is an illustration of the linear relationship of the flux level $\phi$ versus time $t$ when the embodiment of FIG. 8 is operated with the magnetomotive force fields of FIG. 9.

With particular reference to FIG. 6 there is illustrated the linear relationship, over the range $\phi_1$—$\phi_5$ of the stable-state flux level and the pulse duration. In applicant's present invention this variation of the flux level is achieved by the action of a constant-amplitude variable-duration pulse. Accordingly, the change in flux level is a linear function of the time separation between the spikes of a transient electrical signal which time separation determines the duration of the corresponding pulse. This relationship is as discussed with respect to FIG. 3.

Figure 7:
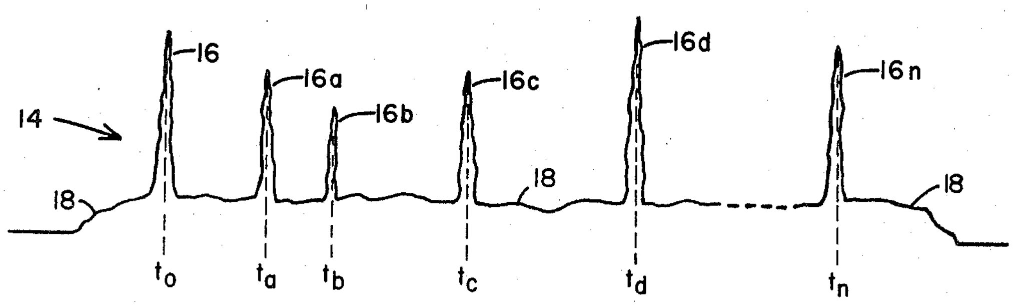
FIG. 7 is an illustration of a typical transient electrical signal having a plurality of significant peaks or spikes.

The present invention is concerned with a detector for and a method of sampling a transient signal having a plurality of spikes for storing an indication of the time separation between the spikes while using the partial switching of a magnetic device. With particular reference to FIG. 7 there is illustrated a typical transient electrical signal 14 which contains a plurality of relatively short duration peaks, or spikes 16, 16*a*, 16*b* . . . 16*n*. Signal 14 is assumed to originate in an external source and is, in this embodiment, limited to a unidirectional signal whose base portion 18 maximum amplitude, as regards the coupled shift register 20, is less than the gating threshold necessary to toggle the shift register into succesively higher stages.

Figure 8:
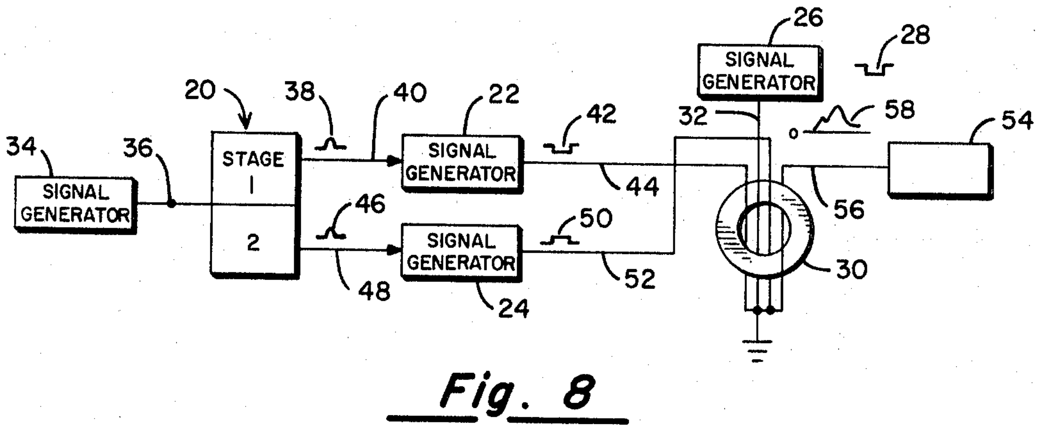
FIG. 8 is an illustration of a preferred embodiment of the present invention capable of measuring the time separation between two spikes of the transient electrical signal of FIG. 7.

With particular reference to FIG. 8 there is illustrated a preferred embodiment of the present invention, which embodiment is capable of providing an indication of the time separation between the two consecutive spikes 16, 16*a* of signal 14. Prior to time $t_0$—see FIG. 9—stages 1, 2 of shift register 20 are coupling ground potentials to their respective constant voltage source type signal generators 22, 24 and signal generator 26 has coupled saturating pulse 28 to core 30 by way of drive line 32 setting core 30 into the counterclockwise negative saturated remanent magnetic stable state—$\phi_s$—see FIG. 5. This may be considered as a preliminary preset condition.

Although the present invention is directed toward the detection of a transient electrical signal having a pluraltiy of unipolar, successive significant different, amplitude peak signals, or spikes, the system as disclosed is capable of measuring the time separation between a series of bipolar, randomly spaced, pulses of similar amplitude. When it is desired to detect the time separation between such different polarity signals the previously mentioned substantially-saturated $-\phi_s$ preset condition would be changed to a substantially-unsaturated remanent magnetic stable state $\phi_3$—see FIG. 5—which is the substantially demagnetized, or 50% flux level, state. In this arrangement a buck-out core—see the copending patent application of V. J. Korkowski et al., filed Mar. 17, 1964, Ser. No. 352,524, assigned to the same assignee as is the present invention, for a detailed discussion of the use of a buck-out core—would be utilized.

Prior to time $t$=0 signal generator 34 couples signal 14 to shift register 20 at input terminal 36. At time $t_0$ spike 16 of signal 14 toggles stage 1 of shift register 20 causing it to couple a trigger pulse 38 to signal generator 22 by way of conductor 40. Signal generator 22 then couples pulse 42 to core 30 by way of drive line 44 generating the negative going magnetomotive force (MMF) pulse 45 causing the magnetic state of core 30 to move along the substantially horizontal portion of loop 10 toward point 46. At time $t_a$ spike 16*a* of signal 14 toggles stage 2 of shift register 20 causing it to couple a trigger pulse 46 to signal generator 24 by way of conductor 48. Signal generator 24 then couples pulse 50 to core 30 by way of drive line 52. With signals 42 and 50 being of substantially the same amplitude but of opposite polarity the net magnetomotive force applied to core 30 due to signals 42 and 50 is substantially zero permitting the magnetic state of core 30 to return to its original preset magnetic state $-\phi_s$. At time $t_2$ signal 42 terminates whereupon the still continuing signal 50 generates the positive going MMF pulse 12 which begins to initiate the time-limited switching of the magnetic state of core 30 from $-\phi_s$ in the +NI direction. The duration of signal 50 after the termination of signal 42—from $t_2$ to $t_3$—establishes the magnetic state of core 30 at a corresponding flux level, such as $\phi_3$, which level is representative of the time separation of spikes 16, 16*a*.

In the illustrated embodiment of FIG. 9 signals 42 and 50 are of equal length, although such is not to be construed as a limitation thereto, such that $t_2-t_0$ equals $t_3-t_a$ and consequently $t_a-t_0$ equals $t_3-t_2$. Consequently, the time separation between spikes 16, 16*a* of $t_a-t_0$ is equal to the duration of pulse 12 of $t_3-t_2$.

Readout of the flux level $\phi_3$ of core 30 is accomplished by the coupling of pulse 28 to core 30 by way of drive line 32. Pulse 28 moves the magnetic state of core 30 into a substantially saturated negative flux condition such as point 46 and upon the termination of pulse 28 the magnetic state of core 30 returns to $-\phi_s$. The traversal of the magnetic state of core 30 from $\phi_3$ to $-\phi_s$ induces in sense line 56 a signal 58 which is coupled to utilization means 54. Utilization means 54 may include a suitable means of evaluation of the integral of signal 58 to provide an output indicative of the flux change $\phi_3-\phi_s$ and, consequently, the corresponding time separation of spikes 16, 16*a*. For one possible such evaluation means see copending patent application of F. G. Hewitt et al., Ser. No. 386,823, filed Aug. 3, 1964, assigned to the same assignee as is the present invention With particular reference to FIG. 10 there is illustrated a second preferred embodiment of the present invention, which embodiment is capable of providing an indication of a time separation between the five consecutive spikes 16, 16*a*, 16*b*, 16*c*, and 16*d* of signal 14. As in the prior discussion with regard to the embodiment of FIGS. 8 and 9 prior to time $t_0$—see FIG. 11— stages 1, 2, 3, 4 and 5 of shift register 60 are coupling ground potentials to their respective constant voltage source type signal generators 62, 64, 66, 68 and 70 and signal generator 72 has coupled saturating pulse 74 to cores 76, 78, 80 and 82 by way of drive line 84 setting such cores into a counterclockwise negative saturated remanent magnetic stable state $-\phi_s$ —see FIG. 5.

Prior to time $t=t_0$ signal generator 86 couples signal 14 to shift register 60 at input terminal 88. At time $t_0$ spike 16 of signal 14 toggles stage 1 of shift register 60 causing it to couple a trigger pulse 90 to signal generator 62 by way of conductor 92. Signal generator 62, in turn, couples pulse 94 to conductor 96 generating MMF pulse 98 at core 76. As with the previous discussion with regards to FIG. 8, pulse 98 affects no irreversible switching of core 76.

At time $t_a$ spike 16*a* of signal 14 toggles stage 2 of shift register 60 causing it to couple a trigger pulse 100 to signal generator 64 by way of conductor 102. Signal generator 64, in turn, couples pulse 104 to conductor 106 terminating pulse 98 at core 76 and generating MMF pulse 107 at core 78. As with the previous discussion with regard to FIG. 8, pulse 107 effects no irreversible switching of core 278.

At time $t_b$ spike 16*b* of signal 14 toggles stage 3 of shift register 60 causing it to couple a trigger pulse 110 to signal generator 66 by way of conductor 112. Signal generator 66, in turn, couples pulse 114 to conductor 116 terminating pulse 107 at core 78 and generating MMF pulse 117 at core 80. As with the previous discussion with regard to FIG. 8, pulse 117 effects no irreversible switching of core 80.

At time $t_1$ pulse 94 terminates, enabling the still flowing pulse 104 at core 76 to generate MMF pulse 108 which initiates the time-limited irreversible switching of the magnetic state of core 76 from $-\phi_s$ toward the +NI direction.

At time $t_c$ spike 16*c* of signal 14 toggles stage 4 of shift register 60 causing it to couple a trigger pulse 118 to signal generator 68 by way of conductor 120. Signal generator 68, in turn, couples pulse 124 to conductor 126 terminating pulse 117 at core 80 and generating MMF pulse 128 at core 82. As with the previous discussion of FIG. 8 pulse 128 effects no irreversible switching of core 82. Additionally, at this time pulse 104 terminates, enabling the still flowing pulse 114 at core 78 to generate MMF pulse 130 which initiates the time-limited ireversible switching of the magnetic state of core 78 from $-\phi_s$ toward the +NI direction. Further, the termination of pulse 104 terminates pulse 108 at core 76 terminating the time-limited irreversible switching of the magnetic state of core 76 at a flux level that is representative of the duration of pulse 108 and, correspondingly, the time separation $t_0-t_a$ between spikes 16, 16*a* of signal 14.

At time $t_2$ pulse 114 terminates, enabling the still flowing pulse 124 at core 80 to generate MMF pulse 132 which initiates the time-limited irreversible switching of the magnetic state of core 80 from $-\phi_s$ toward the +NI direction. Additionally, the termination of pulse 114 terminates pulse 130 at core 78 terminating the time-limited irreversible switching of the magnetic state of core 78 at a flux level that is representative of the duration of pulse 130 and, correspondingly, the time separation $t_a-t_b$ between spikes 16*a*, 16*b* of signal 14.

At time $t_d$ spike 16*d* of signal 14 toggles stage 5 of shift register 60 causing it to couple a trigger pulse 140 to signal generator 70 by way of conductor 142. Signal generator 70 in turn couples pulse 134 to conductor 136 terminating pulse 128 at core 82.

At time $t_3$ pulse 124 terminates enabling the still flowing pulse 134 at core 82 to generate MMF pulse 144 which initiates the time-limited irreversible switching of the magnetic state of core 82 from $-\phi_s$ toward the +NI direction. Additionally, the termination of pulse 124 terminates pulse 132 at core 80 terminating the time-limited irreversible switching of the magnetic state of core 80 at a flux level that is representative of the duration of pulse 132 and, correspondingly, the time separation $t_b-t_c$ between between spikes 16*b*, 16*c* of signal 14.

At time $t_4$ pulse 134 terminates terminating pulse 144 at core 82 terminating the time-limited irreversible switching of the magnetic state of core 82 at a flux level that is representative of the duration of pulse 144 and correspondingly, the time separation $t_c-t_d$ between spikes 16*c*, 16*d* of signal 14.

Figure 10:
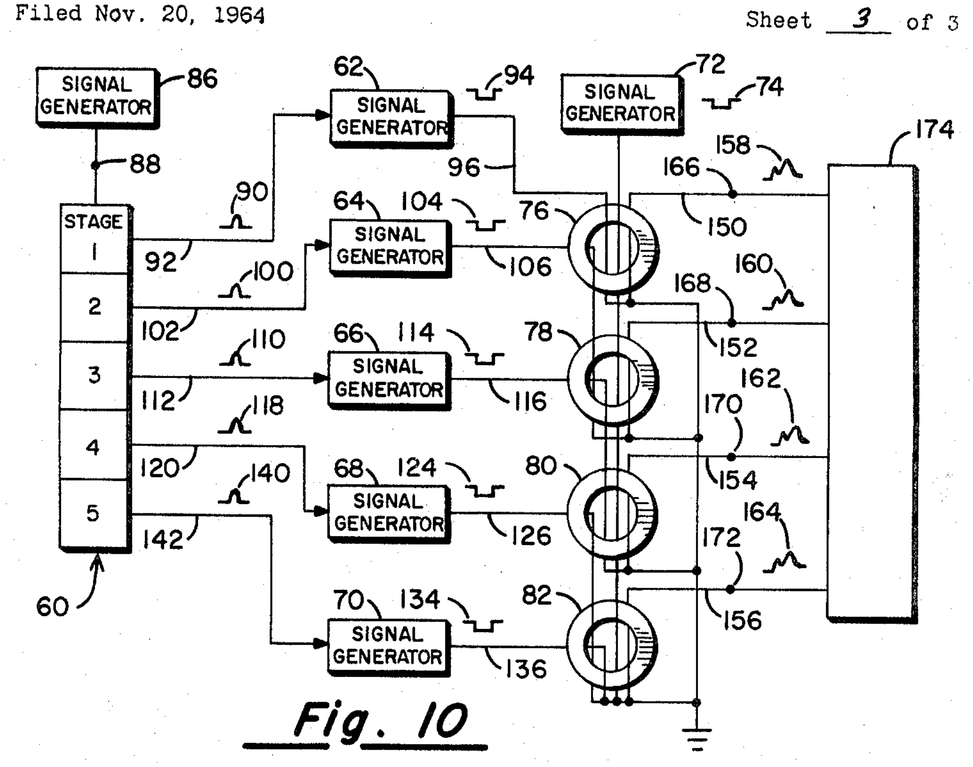
FIG. 10 is an illustration of a second embodiment of the present invention capable of recording the time separation between a plurality of consecutive spikes of the typical transient electrical signal of FIG. 1.
Figure 11:
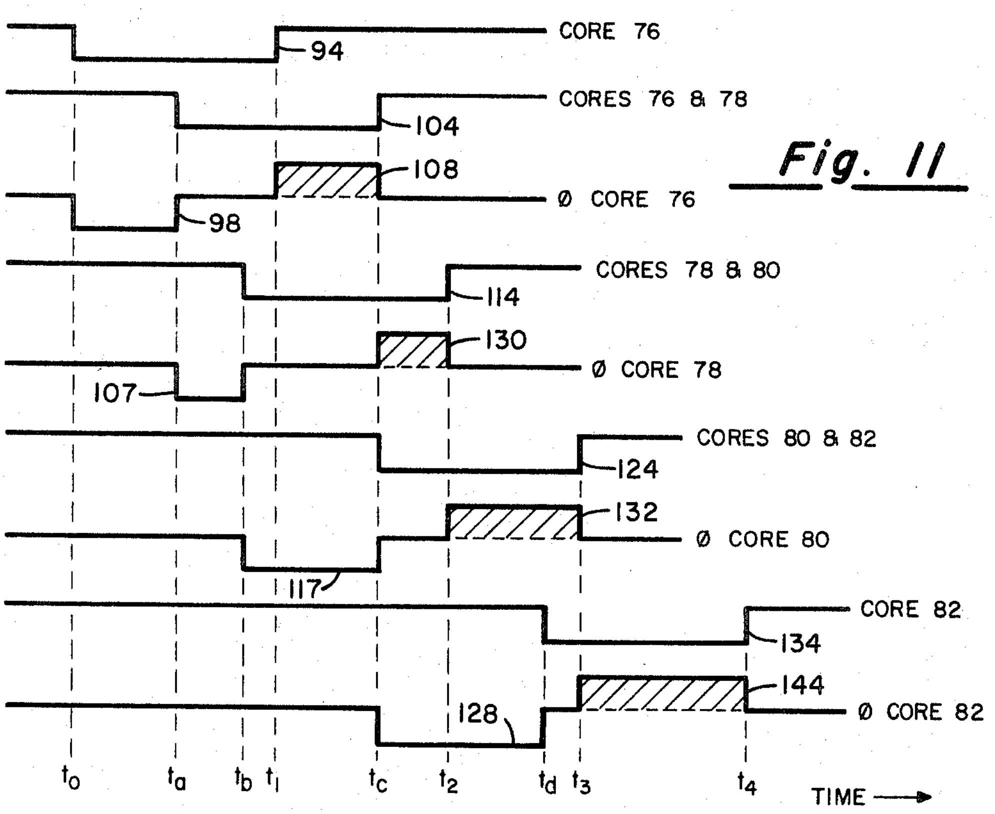
FIG. 11 is an illustration of the signals and resulting magnetomotive forces applied to the illustrated embodiment of FIG. 10.

In accordance with the above discussion of the embodiment of FIGS. 10 and 11 and subsequent to time $t_4$ cores 76, 78, 80 and 82 have their magnetic states set into time-limited flux levels representative of the time separation of spikes 16, 16*a*, 16*b*, 16*c* and 16*d* of signal 14, respectively. Readout of the information stored in such cores may be accomplished by signal generator 72 coupling saturating pulse 74 to such cores by way of drive line 84. Pulse 74 sets the magnetic states of such cores back into their initial preset $-\phi_s$ remanent state and inducing thereby in the associated sense lines 150, 152, 154 and 156 the respective output signals 158, 160, 162, 164 that are coupled at their respective output terminals 166, 168, 170 and 172 to utilization means 174. Utilization means 174 may be similar to utilization means 54 of FIG. 8 or may be of any well known design capable of evaluation of the respective output signals.

Although the illustrated embodiments of FIG. 8 and FIG. 10 utilize ferrite toroidal cores as the magnetizable memory element no such limitation is to be intended; any magnetizable memory element such as a Transfluxor, Balanced Flux, Laddic, or thin ferromagnetic film element may be utilized. As is well known in the art, where nondestructive readout of the stored information is desired a Transfluxor element may be used with the stored information read out as the level of switchable flux about the small aperture.

It is understood that suitable modifications may be made in the structure as disclosed provided such modifications come within the spirit and scope of the appended claims. Having now, therefore, fully illustrated and described my invention, what I claim to be new and desired to protect by Letters Patent is set forth in the appended claims.

I claim:

1. A detector for establishing in a magnetizable memory element a partially-switched stable-state which is representative of the time separation between successive pulses of an electrical signal, comprising:

a magnetizable memory element having a substantially rectangular hysteresis characteristic defining first and second oppositely-polarized substantially-saturated stable-states and having a plurality of intermediate partially-switched stable states;

means for receiving an electrical signal having first and second successive pulses of unknown time separation and for generating first and second successive, partially concurrent, constant voltage type drive signals of substantially similar amplitude-duration characteristics and of a duration greater than said unkown time separation upon receipt of said first and second successive pulses of said electrical signal, respectively;

means for coupling said first and second successive drive signals to said memory element;

said first and second successive drive signals interacting at said memory element for setting the magnetization of said memory element into a partially switched stable-state representative of the time separation between said first and second successive pulses of said electrical signal.

2. A detector for establishing in a magnetizable memory element a time-limited stable-state which is representative of the time separation between successive pulses of an electrical signal, comprising:

a magnetizable memory element having a substantially rectangular hysteresis characteristic defining first and second oppositely-polarized substantially-saturated stable-states and having a plurality of intermediate time-limited stable-states;

preset signal generator means coupled to said memory element for presetting the magnetization of said memory element into a first-polarity substantially-saturated stable-state;

means for receiving a transient electrical signal having first and second successive significant pulses of of random time separation and for generating first and second successive constant voltage type drive signals of substantially similar amplitude-duration characteristics and of a duration greater than said random time separation upon receipt of said first and second successive pulses of said transient electrical signal, respectively;

means for coupling said first and second successive drive signals to said memory element at least partially concurrently;

said first and second successive drive signals interacting at said memory element for setting the magnetization of said memory element into a time-limited stable-state representative of the time separation between said first and second successive pulses or said transient electrical signal.

3. A detector for establishing in a magnetizable memory element a partially-switched stable-state which is representative of the time separation between successive pulses of an electrical signal, comprising:

a plurality of magnetizable memory elements, each having a substantially rectangular hysteresis characteristic defining first and second oppositely-polarized substantially-saturated stable-states and having a plurality of intermediate partially-switched stable-states;

preset signal generator means coupled to said elements for presetting the magnetization of said memory elements into a preset stable-state;

means for receiving an electrical signal, said electrical signal having a plurality of successive significant pulses of random time separation and for generating first and successive constant voltage type drive signals upon receipt of the first and successive pulses of said electrical signal, respectively;

each of said drive signals capable of setting the magnetization of a selected one of said memory elements into a predetermined partially-switched stable-state;

means for common coupling certain ones of said first and successive drive signals to selected ones of said memory elements;

said ones of said first and successive drive signals interacting at their common coupled memory elements for setting the magnetization of said common coupled memory elements into partially-switched stable-states representative of the time separation between corresponding successive pulses of said electrical signal.

4. A detector for establishing in a magnetizable memory element a time-limited stable-state which is representative of the time separation between successive pulses of an electrical signal, comprising:

a plurality of magnetizable memory elements, each having a substantially rectangular hysteresis characteristic defining first and second oppositely-polarized substantially-saturated stable states and having a plurality of intermediate time-limited stable-states;

preset signal generator means coupled to said elements for presetting the magnetization of said memory elements into a first-polarity substantially-saturated stable state;

means for receiving a transient electrical signal, said transient electrical signal having a plurality of successive significant pulses of random time separation and for generating first and successive constant voltage type drive signals upon receipt of the first and successive pulses of said transient electrical signals, respectively;

each of said drive signals capable of setting the magnetization of a selected one of said memory elements into a time-limited stable-state;

means for coupling successive pairs of said first and successive drive signals to common coupled selected pairs of said memory elements;

said pairs of said first and successive drive signals interacting at their common coupled selected pairs of memory elements for setting the magnetization of said memory elements into time-limited stable-states representative of the time separation between corresponding successive pulses of said transient electrical signal.

5. A detector for establishing in a magnetizable memory element a time-limited stable-state which is representative of the time separation between successive spikes of a transient electrical signal, comprising:

a plurality of magnetizable memory elements, each having a substantially rectangular hysteresis characteristic defining first and second oppositely-polarized substantially-saturated stable-states and having a plurality of intermediate time-limited stable-states;

preset signal generator means coupled to said elements for presetting the magnetization of said memory elements into a preset saturated stable-state;

drive means for receiving a transient electrical signal, said transient electrical signal having a plurality of randomly spaced significant spikes and for generating first and successive constant voltage type drive signals upon receipt of the first and successive spikes of said transient electrical signal, respectively;

means for coupling certain ones of said first and successive drive signals to selected pairs of said memory elements;

said ones of said first and successive drive signals interacting at their selected pairs of memory elements for setting the magnetization of said memory elements into time-limited stable-states representative of the time separation between corresponding successive spikes of said transient electrical signal;

readout means coupled to said memory elements for evaluating the respective time-limited stable-states of said memory elements as the time separation between corresponding successive spikes of said transient electrical signal.

6. A detector for establishing in a magnetizable memory element a time-limited stable-state which is representative of the time separation between successive spikes of a transient electrical signal, comprising:

a plurality of magnetizable memory elements, each having a substantially rectangular hysteresis characteristic defining first and second oppositely-polarized substantially-saturated stable-states and having a plurality of intermediate time-limited stable-states;

preset signal generator means coupled to said elements for presetting the magnetization of said memory elements into a preset stable-state;

counter means for receiving a transient electrical signal, said transient electrical signal having a plurality of randomly spaced significant spikes and for generating first and successive trigger signals upon receipt of the first and succcessive spikes of said transient electrical signal, respectively;

a plurality of constant voltage type signal generators for generating a pulse type drive signal for setting the magnetization of a selected one of said memory elements into a predetermined time-limited stable-state;

first and successive ones of said constant-voltage type signal generators triggered by first and successive ones of said trigger signals, respectively, and emitting said first and successive drive signals, respectively;

means for coupling certain ones of said first and sucessive drive signals to selected pairs of said memory elements;

said ones of said first and successive drive signals interacting at their selected pairs of memory elements for setting the magnetization of said memory elements into time-limited stable states representative of the time separation between corresponding successive spikes of said transient electrical signal;

readout means coupled to said memory elements for evaluating the respective flux levels of said memory elements as the time separation between corresponding successive spikes of said transient electrical signal.

7. A detector for establishing in a magnetizable memory element a time-limited stable-state which is representative of the time separation between successive spikes of a transient electrical signal, comprising:

a plurality of magnetizable memory elements, each having a substantially rectangular hysteresis characteristic defining first and second oppositely-polarized substantially-saturated stable-states and having a plurality of intermediate time-limited stable-states;

preset signal generator means coupled to said elements for presetting the magnetization of said memory elements into preset stable-state;

drive means for receiving a transient electrical signal, said transient electrical signal having a plurality of successive significant spikes of random time separation and for generating first and successive constant voltage type drive signals upon receipt of the first and successive spikes of said transient electrical signal, respectively, for setting the magnetization of a selected one of said memory elements into a time-limited stable-state;

means for coupling successive pairs of said first and successive drive signals corresponding to selected ones of said memory elements;

said successive pairs of said first and successive drive signals interacting at their corresponding selected one of said memory elements for setting the magnetization of said corresponding selected one of said memory elements into a time-limited stable-state representative of the time separation between the corresponding successive spikes of said transient electrical signal.

8. A detector for establishing in a magnetizable memory element a time-limited stable-state which is representative of the time separation between successive peak signals of a transient electrical signal, comprising:

a plurality of magnetizable memory elements, each having a substantially rectangular hysteresis characteristic defining first and second oppositely-polarized substantially-saturated stable-states and having a plurality of intermediate time-limited stable-states;

preset signal generator means coupled to said elements for presetting the magnetization of said memory elements for presetting the magnetization of said memory elements into a first-polarity substantially-saturated stable-state;

means for receiving a transient electrical signal, said transient electrical signal having a plurality of successive significant peak signals of random time separation, and for generating first and successive trigger signals upon receipt of the first and successive peak signals of said transient electrical signal, respectively;

a plurality of constant voltage type signal generators for generating a pulse type drive signal for setting the magnetization of a selected one of said memory elements into a time-limited stable-state;

first and successive ones of said constant-voltage type signal generators triggered by first and successive ones of said trigger signals, respectively, and generating first and successive drive signals, respectively;

means for common coupling ones of said first and successive drive signals to selected ones of said memory elements;

said ones of said first and successive drive signals interacting at their common coupled memory element for setting the magnetization of said common coupled memory element into a time-limited stable-state representative of the time separation between the corresponding successive peak signals of said transient electrical signal.

References Cited

UNITED STATES PATENTS

| | | | |
|---|---|---|---|
| 3,281,670 | 10/1966 | Myers et al. | 324—47 |
| 3,370,231 | 2/1968 | Van Zurk. | |

OTHER REFERENCES

IBM Technical Disclosure Bulletin, vol. 3, No. 12, pp. 34–35, May 1961.

RUDOLPH V. ROLINEC, *Primary Examiner.*

P. F. WILLE, *Assistant Examiner.*

U.S. Cl. X.R.

324—34, 43

UNITED STATES PATENT OFFICE

CERTIFICATE OF CORRECTION

Patent No. 3,431,491 March 4, 1969

Lanny L. Harklau

It is certified that error appears in the above identified patent and that said Letters Patent are hereby corrected as shown below:

Column 12, lines 27 and 28, cancel "for presetting the magnetization of said memory elements".

Signed and sealed this 31st day of March 1970.

(SEAL)
Attest:

Edward M. Fletcher, Jr.
Attesting Officer

WILLIAM E. SCHUYLER, JR.
Commissioner of Patents